(12) United States Patent
Shi et al.

(10) Patent No.: US 8,705,617 B2
(45) Date of Patent: Apr. 22, 2014

(54) MULTIPLE LAYER VIDEO ENCODING

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1648 days.

(21) Appl. No.: 11/527,021

(22) Filed: Sep. 25, 2006

(65) Prior Publication Data

US 2007/0071093 A1    Mar. 29, 2007

Related U.S. Application Data

(60) Provisional application No. 60/721,435, filed on Sep. 27, 2005.

(51) Int. Cl.
*H04N 11/04* (2006.01)

(52) U.S. Cl.
USPC .................................................. 375/240.03

(58) Field of Classification Search
USPC .............. 375/E7.027, E7.09, E7.093, 240.03, 375/240.23
See application file for complete search history.

(56) References Cited

U.S. PATENT DOCUMENTS

| | | | | |
|---|---|---|---|---|
| 5,510,842 | A * | 4/1996 | Phillips et al. | 375/240.25 |
| 5,781,561 | A * | 7/1998 | Machida et al. | 714/752 |
| 6,795,501 | B1 * | 9/2004 | Zhu | 375/240.03 |
| 6,882,685 | B2 | 4/2005 | Malvar | |
| 7,778,327 | B2 * | 8/2010 | Zhou | 375/240.03 |
| 2002/0001412 | A1 | 1/2002 | Konstantinides et al. | |
| 2003/0123739 | A1 | 7/2003 | Graffagnino | |
| 2003/0202710 | A1 | 10/2003 | Cheung et al. | |
| 2004/0218825 | A1 | 11/2004 | Graffagnino | |
| 2006/0120448 | A1 * | 6/2006 | Han et al. | 375/240.2 |

FOREIGN PATENT DOCUMENTS

| | | |
|---|---|---|
| CL | 540-2006 | 3/2006 |
| CL | 2554-2006 | 9/2006 |
| JP | H0654196 A | 2/1994 |
| JP | 6244736 A | 9/1994 |
| JP | H11346366 A | 12/1999 |
| JP | 2001245301 A | 9/2001 |
| JP | 2005057738 A | 3/2005 |
| JP | 2005094054 A * | 4/2005 |
| KR | 1020030020382 | 3/2003 |

(Continued)

OTHER PUBLICATIONS

Macnicol et al., "Rate control for MPEG-2 SNR scalability and stream morphing using codeword estimation and overhead modelling" Elsevier Signal Processing: Image Communication vol. 18, Issue 9, Oct. 2003, pp. 837-853.*

(Continued)

*Primary Examiner* — Mehrdad Dastouri
*Assistant Examiner* — Mohammed Rahaman
(74) *Attorney, Agent, or Firm* — Arent Fox LLP

(57) ABSTRACT

Certain embodiments disclosed herein provide systems and methods for processing multimedia data. The systems and methods comprise receiving a first set of quantized coefficients representing at least one video frame, receiving a second set of quantized coefficients representing the at least one video frame, and generating, using the first set of quantized coefficients and second set of quantized coefficients, a third set of quantized coefficients representing the at least one video frame. In certain embodiments, quantization parameters associated with the first and second sets are used in producing the third set of quantized coefficients.

17 Claims, 5 Drawing Sheets

(56) References Cited

FOREIGN PATENT DOCUMENTS

| KR | 1020050076160 | | 7/2005 |
| WO | WO2004030369 | A1 | 4/2004 |
| WO | 2006099221 | A2 | 9/2006 |

OTHER PUBLICATIONS

JP2005094054A translation.*

Joint Committee Draft (CD), Joint Video Team (JVT) of ISO/IEC MPEG and ITU-T VCEG, JVT-C167, May 10, 2002, pp. 55-58.

Macnicol J. et al.: "Scalable video coding by stream morphing," Proceedings 2002 International Conference on Image Processing. ICIP 2002. Rochester, NY, Sep. 22-25, 2002, International Conference on Image Processing, New York, NY: IEEE, US, vol. 2 of 3, Sep. 22, 2002, p. 733-736.

Macnicol J. et al.: "Scalable video coding by stream morphing," IEEE Transactions on Circuits and Systems for Video Technology, IEEE Service Center, Piscataway, NJ, US, vol. 15, No. 2, Feb. 2005, pp. 306-319.

International Search Report—PCT/US2006/037999—European Patent Office—Mar. 16, 2007.

Written Opinion—PCT/US2006/037999—European Patent Office—Mar. 16, 2007.

International Preliminary Report on Patentability—PCT/US2006/037999—The International Bureau of WIPO—Geneva, Switzerland—Apr. 1, 2008.

* cited by examiner

MULTIPLE LAYER VIDEO ENCODING

CROSS-REFERENCE TO RELATED APPLICATIONS

The present application for patent claims priority to Provisional Application No. 60/721,435 entitled "A METHOD OF COEFFICIENT EXPANSION FOR SCALABLE CODING ON MULTIPLE CHIP SYSTEM" filed Sep. 27, 2005, which is hereby expressly incorporated by reference herein.

BACKGROUND

1. Field

This disclosure is directed to a method and an apparatus for processing multiple layer video data.

2. Background

Due to the explosive growth and great success of the Internet and wireless communication, as well as increasing demand for multimedia services, streaming media over the Internet and mobile/wireless channels have drawn tremendous attention. In heterogeneous Internet Protocol (IP) networks, video is provided by a server and can be streamed by one or more clients. Wired connections include dial-up, ISDN, cable, xDSL, fiber, LAN (local area network), WAN (wide area network) and others. The transmission mode can be either uni-cast or multi-cast. The variety of individual client devices, including PDA (personal digital assistant), laptop, desktop, set-top box, TV, HDTV (high-definition television), mobile phone and others, requires bitstreams of different bandwidths simultaneously for the same content. The connection bandwidth could vary quickly with the time (from 9.6 kbps to 100 Mbps and above), and can be faster than a server's reaction.

Similar to the heterogeneous IP network is mobile/wireless communication. Transport of multimedia content over mobile/wireless channels is very challenging because these channels are often severely impaired due to multi-path fading, shadowing, inter-symbol interference, and noise disturbances. Some other reasons such as mobility and competing traffic also cause bandwidth variations and loss. The channel noise and the number of users being served determine the time-varying property of channel environments. In addition to environmental conditions, the destination network can vary from second to third generation cellular networks to broadband data-only networks due to geographic location as well as mobile roaming. All these variables call for adaptive rate adjustment for multimedia content, even on the fly. Thus, successful transmission of video over heterogeneous wired/wireless networks requires efficient coding, as well as adaptability to varying network conditions, device characteristics, and user preferences, while also being resilient to losses.

To meet different user requirements and to adapt to channel variation, one could generate multiple independent versions of bitstreams, each meeting one class of constraints based on transmission bandwidth, user display and/or computational capability, but this is not efficient for server storage and multicast application. In scalable coding, where a single macro-bitstream accommodating high-end users is built at the server, the bitstreams for low-end applications are embedded as subsets of the macro-bitstream. As such, a single bitstream can be adapted to diverse application environments by selectively transmitting sub-bitstreams. Another advantage provided by scalable coding is for robust video transmissions on error prone channels. Error protection and error concealment can be easily handled. A more reliable transmission channel or a better error protection can be applied to base layer bits that contain the most significant information.

There are spatial, temporal and signal to noise ratio (SNR) scalabilities in hybrid coders like MPEG-1, MPEG-2, MPEG-4 (collectively referred to as MPEG-x), H.261, H.262, H.263, and H.264 (collectively referred to as H.26x). In hybrid coding, temporal redundancy is removed by motion-compensated prediction (MCP). Video is typically divided into a series of groups of pictures (GOP), where each GOP begins with an intra-coded frame (I) followed by an arrangement of forward (and/or backward) predicted frames (P) and bi-directional predicted frames (B). Both P frames and B frames are inter-predicted frames employing MCP. A base layer can contain the most significant information of I frames, P frames or B frames at a lower quality level, and an enhancement layer can contain higher quality information of the same frames or additional temporal scaling frames not contained in the base layer. SNR scalability can be accomplished at a decoder by selectively omitting decoding of the higher quality data in the enhancement layer while decoding the base layer data. Depending on how the data is parsed between the base layer and the enhancement layer, decoding of the base layer plus enhancement layer data can introduce increased complexity and memory requirements. Increased computational complexity and increased memory requirements can be detrimental to the performance of power limited and computationally limited devices such as PDA's (personal digital assistants), mobile phones and the like. What is desired is that the decoding of the base layer plus the enhancement layers does not significantly increase the computational complexity and memory requirements of such devices.

SUMMARY

Thus, it would be advantageous to develop a system and method for decoding the base layer plus the enhancement layers without significantly increasing computation complexity and required memory.

One embodiment includes a method for processing multimedia data. The method comprises receiving a first set of quantized coefficients representing at least one video frame, receiving a second set of quantized coefficients representing the at least one video frame, and generating, using the first set of quantized coefficients and second set of quantized coefficients, a third set of quantized coefficients representing the at least one video frame.

In certain embodiments, the method further comprises receiving variable length coefficient (VLC) data representing the at least one video frame, and processing the VLC data to generate the first set of quantized coefficients and the second set of quantized coefficients, wherein the VLC data processing causing the generation of the first set and second set of quantized coefficients is performed by a single processor. In certain embodiments, the second set of quantized coefficients is indicative of at least one refinement to the first set of quantized coefficients. In certain embodiments, the third set of quantized coefficients is generated by adding the first set of quantized coefficients to the second set of quantized coefficients. In certain embodiments, the first set of quantized coefficients is combined with the second set of quantized coefficients to produce the third set of quantized coefficients is based in part on a first quantization parameter associated with the first set of quantized coefficients and a second quantization parameter associated with the second set of quantized coefficients. In certain embodiments, the first quantization parameter and second quantization parameter have a common denominator other than one.

Another embodiment includes an apparatus for processing multimedia data. The apparatus comprises means for receiving a first set of quantized coefficients representing at least one video frame, means for receiving a second set of quantized coefficients representing the at least one video frame, and means for generating using the first set of quantized coefficients and second set of quantized coefficients, a third set of quantized coefficients representing the at least one video frame.

In certain embodiments, the apparatus further comprises means for receiving VLC data representing the at least one video frame, and means for processing the VLC data to generate the first set of quantized coefficients and the second set of quantized coefficients, wherein the VLC data processing causing the generation of the first set and second set of quantized coefficients is performed by a single processor. In certain embodiments, quantization parameters associated with the first set of quantized coefficients and the second set of quantized coefficients have a common denominator other than one. In certain embodiments, the common denominator is six. In certain embodiments, the means for generating the third set of quantized coefficients uses the first set of quantized coefficients added to the second set of quantized coefficients. In certain embodiments, adding the first set of quantized coefficients to the second set of quantized coefficients to generate the third set of quantized coefficients is based in part on a first quantization parameter associated with the first set of quantized coefficients and a second quantization parameter associated with the second set of quantized coefficients. In certain embodiments, the second set of quantized coefficients is indicative of at least one refinement to the first set of quantized coefficients.

A further embodiment includes an apparatus for processing multimedia data. The apparatus comprises a receiving module configured to receive a first set of quantized coefficients representing at least one video frame and a second set of quantized coefficients representing the at least one video frame, and a processing module configured to generate using the first set of quantized coefficients and second set of quantized coefficients, a third set of quantized coefficients representing the at least one video frame.

Yet another embodiment includes a machine readable medium comprising instructions for processing multimedia data, wherein the instructions upon execution cause a machine to determine a first set of quantized coefficients representing at least one video frame, determine a second set of quantized coefficients representing the at least one video frame, and encode using the first set of quantized coefficients and second set of quantized coefficients, a third set of quantized coefficients representing the at least one video frame.

Another embodiment includes a processor for processing multimedia. The processor is configured to determine a first set of quantized coefficients representing at least one video frame, determine a second set of quantized coefficients representing the at least one video frame, and encode using the first set of quantized coefficients and second set of quantized coefficients, a third set of quantized coefficients representing the at least one video frame.

Neither this summary nor the following detailed description purports to define the invention. The invention is defined by the claims.

DETAILED DESCRIPTION

Methods and apparatus to provide multiple layers of video, including a base layer and one or more enhancement layers, with reduced decoder overhead, are described. Base layer and enhancement layer coefficients may be combined by a decoder device according to certain embodiments disclosed herein before dequantization when both layers are available for decoding, improving the efficiency of the decoding.

In the following description, specific details are given to provide a thorough understanding of the embodiments. However, it will be understood by one of ordinary skill in the art that the embodiments may be practiced without these specific details. For example, electrical components may be shown in block diagrams in order not to obscure the embodiments in unnecessary detail. In other instances, such components, other structures and techniques may be shown in detail to further explain the embodiments.

It is also noted that the embodiments may be described as a process, which is depicted as a flowchart, a flow diagram, a structure diagram, or a block diagram. Although a flowchart may describe the operations as a sequential process, many of the operations can be performed in parallel or concurrently and the process can be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In a conventional single layer decoder, the decoding of I frames, P frames and B frames all follow a similar path. The coefficients, whether representing intra-coded video or residual errors, are dequantized, inverse transformed and then combined with either spatial prediction coefficients or best matching macroblock coefficients respectively.

The encoding and decoding processes described below make scalable decoding of the base layer and/or enhancement layer(s) transparent to components responsible for decoding video data in a way that increases efficiency. Instead of decoding each layer separately, each in its own pass, and then combining the decoded layers, which is an inefficient two-pass approach to making dual-layer decoding transparent, efficient transparency to the decoder can be accomplished by combining the base layer data and enhancement layer modifications to the base layer data, such as by using a preprocessor such as a digital signal processor (DSP), before the combined data is decoded in the hardware video core in a single pass, providing more efficiency.

Figure 1A:
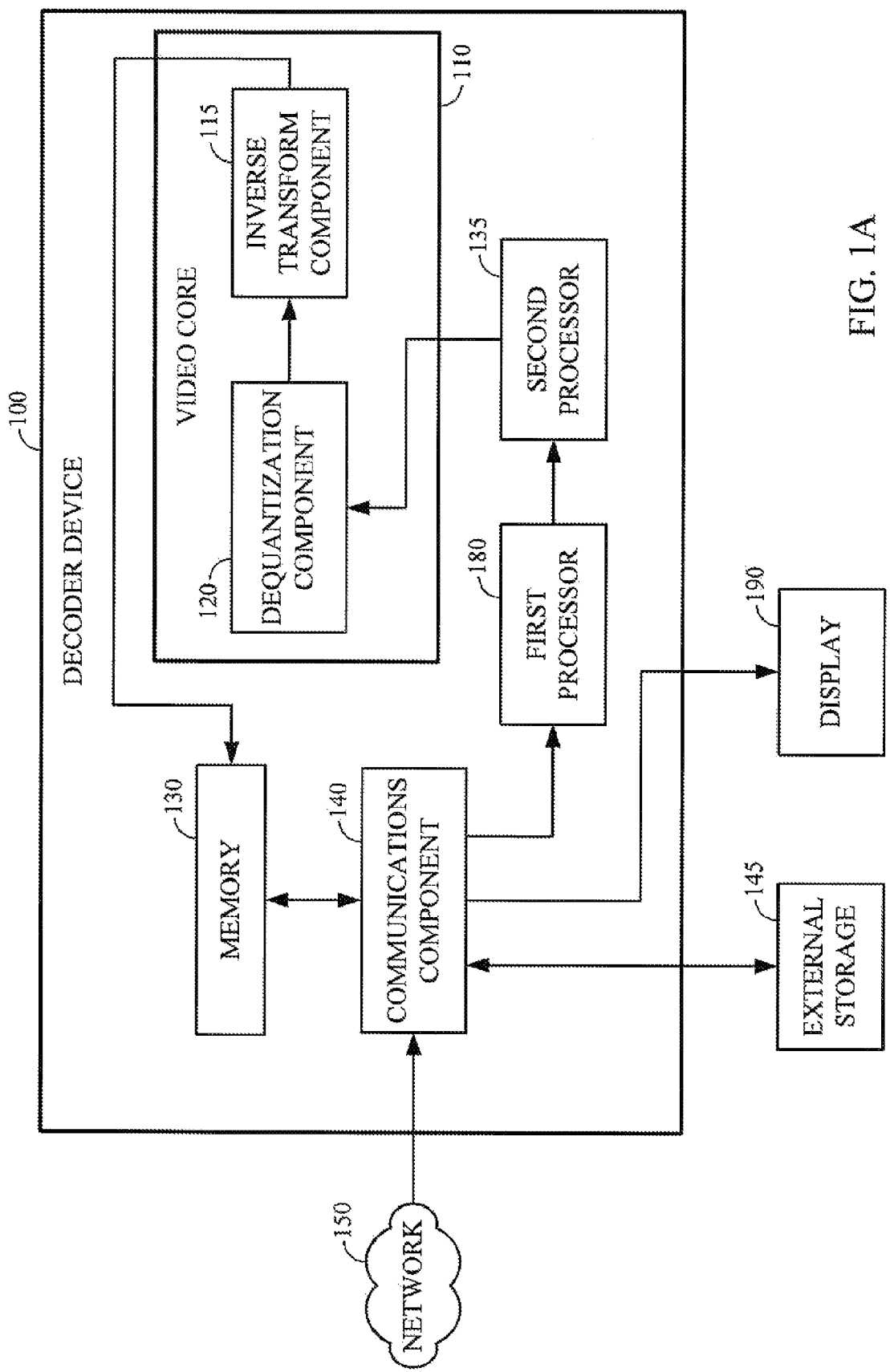
FIG. 1A is an illustration of an example of an encoding system for delivery of streaming video.

FIG. 1A is an illustration of an example of a decoder device 100 for decoding of multiple layers of video. The decoder device 110 contains a video core 110, which includes a dequantization component 120 and an inverse transform component 115, a memory component 130, a communications component 140, a first processor 180 and a second processor 135. The decoder device 100 is engaged to (a) a storage component 145, which may be internal to or external to the decoder device 100, and (b) a display component 190. For purpose discussion and illustration associated with FIG. 1, it is assumed that the storage component 145 is external to the decoder device 100.

The decoder device 100 receives encoded data from an external storage device 145 or from a transmission received from a network 150. Encoded data may comprise transformed data, quantized data, variable length coded (VLC) data or any combination thereof. Furthermore, the encoded data may comprise data for separate layers of video, such as base layer data and enhancement layer data. For example, the communications component 140 may receive VLC data representing a base layer, an enhancement layer, and a look up table for transforming the VLC data for the two layers into quantized coefficients. The communications component 140 contains logic used for receiving (Rx) encoded data in conjunction with network 150, as well as logic for receiving encoded data from external storage 145. External storage 145 could be, for example, external RAM or ROM, or a remote server.

The first processor 180 contains logic for processing VLC data. The first processor 180 contains logic for VLC symbol generation, also known as performing VLC table look ups, VLC run length expansion, and inverse zigzag scanning. The first processor 180 may thus produce unpacked quantized (or residual) coefficients when given VLC data representative of the same. In certain embodiments, the first processor is a reduced instruction set computer (RISC) processor.

The second processor 135 contains logic used for combining data representative of a base layer and enhancement layer, such as quantized coefficients, so that the combined data may later be decoded in a single layer, as discussed in more detail below with reference to FIG. 3. In certain embodiments, the second processor 135 may contain logic for generating base layer decodable data if, for example, the enhancement layer is not received, or received in a corrupted state, or to conserve battery power, or processing power. In certain embodiments, the second processor 135 is a DSP.

When intra-coded data is received, the second processor 135 first processes the data and then sends the processed data to the dequantization component 120 of the video core 110 for dequantization, followed by inverse transformation by the inverse transform component 115 of the video core 110, resulting in a decoded picture that may be displayed on display component 190. On the other hand, inter-coded data is decoded after the reference frame(s), from which it was predicted, is decoded. The residual error coefficients are processed by the second processor 135, dequantization component 120, and inverse transform component 115, resulting in a decoded residual error. The residual error is then combined with a best matching macroblock(s) from the reference frame(s). The decoded frames can be displayed with the display component 190, stored in external storage 145 or stored in internal memory 130.

The display component 190 can be an integrated part of the decoding device that contains such parts as video display hardware and logic, including a display screen, or it can be an external peripheral device. The communications component 175 also contains logic used to communicate the decoded frames to external storage component 185 or display component 190. One or more elements of decoder device 100 may be rearranged and/or combined.

The video core 110 contains two components, the dequantization component 120 and the inverse transform component 115. In certain embodiments, the video core 110 may be implemented as an application specific integrated circuit (ASIC). The dequantization component 120 and the inverse transform component 115 perform de-quantization and inverse transformation, respectively. These inverse operations are performed to allow for reconstruction of coefficients and video frames representing the original video data, such that the residual error calculations and enhancement layer coefficient calculations are as accurate as possible.

When performing inverse quantization, the dequantization component 120 uses the number of bits allocated to represent each of the transformed coefficients as quantized coefficients to recreate the transformed coefficients. The quantization/dequantization of the transformed coefficients may be different for every block, or every macroblock. A macroblock may be a block of 16×16 pixels (made up of a 16×16 Luma block, and two 8×8 Chroma blocks). The quantization parameter (QP) determines the level of quantization that is performed when a transform coefficient is quantized into a quantized coefficient. More digital compression is realized by increasing the QP, thereby providing for a lower quality digital representation of the coefficients. In one example, the lower quality coefficients might be encoded in the base layer of a SNR scalable video stream. Decreasing the QP allows for higher quality digital representation of the coefficients. These higher quality coefficients might be encoded in the enhancement layer of an SNR scalable video stream.

When performing inverse transformation, the inverse transform component 115 transforms the transformed coefficients into video data from the spatial domain, such as decoded video frames. The transformed coefficients may represent the frequency domain, if a DCT (discrete cosine transform) was used. The transformed coefficients may be intra-coded data where the actual video data is transformed, or it can be intra-coded data where the spatial prediction residual is transformed, or it can be inter-coded data where a residual error is transformed. Other digital transforms include the Hadamard transform, DWT (discrete wavelet transform), and integer transforms such as used in H.264.

In video decoding, a hardware embodiment of the video core, for example, may be used to accelerate the computationally intensive decoding process, especially dequantization and inverse transformation. A hardware video core may contain specialized circuitry and/or processor(s) capable of simultaneous execution (pipelining) of several functions. Pipelining enables a reduction in decoding time. Any interruption in the standard pipelined flow, such as an extra inverse transform, an extra dequantization operation or even extra additions could slow down the whole process. It will be apparent to those of skill in the art that one or more embodiments of the video core may be implemented by hardware, software, firmware, middleware, microcode or any combination thereof.

The communications component 140 contains logic used to receive encoded data from an external source, such as a network 150. The external source could also be, for example, external storage 145, a live video and/or audio feed, and receiving the data can include wired and/or wireless communications. The encoded data may comprise transformed data, quantized data, variable length coded data or any combination thereof, as discussed above. The network 150 can be part of a wired system such as a telephone system, a cable system, or fiber optic system, or the network 150 can be a wireless system. In the case of wireless communication systems, the network 150 can comprise, for example, part of a code division multiple access (CDMA or CDMA2000) communication system, or, alternately, the system can be a frequency division multiple access (FDMA) system, a time division multiple access (TDMA) system such as GSM/GPRS (General Packet Radio Service)/EDGE (enhanced data GSM environment) or TETRA (Terrestrial Trunked Radio) mobile telephone technology for the service industry, a wideband code division multiple access (WCDMA), a high data rate (1xEV-DO or 1xEV-DO Gold Multicast) system, or in general any wireless communication system employing a combination of techniques. One or more elements of decoder device 100 may be rearranged and/or combined. For example, the communications component 140 may be external to decoder device 100.

Figure 1B:
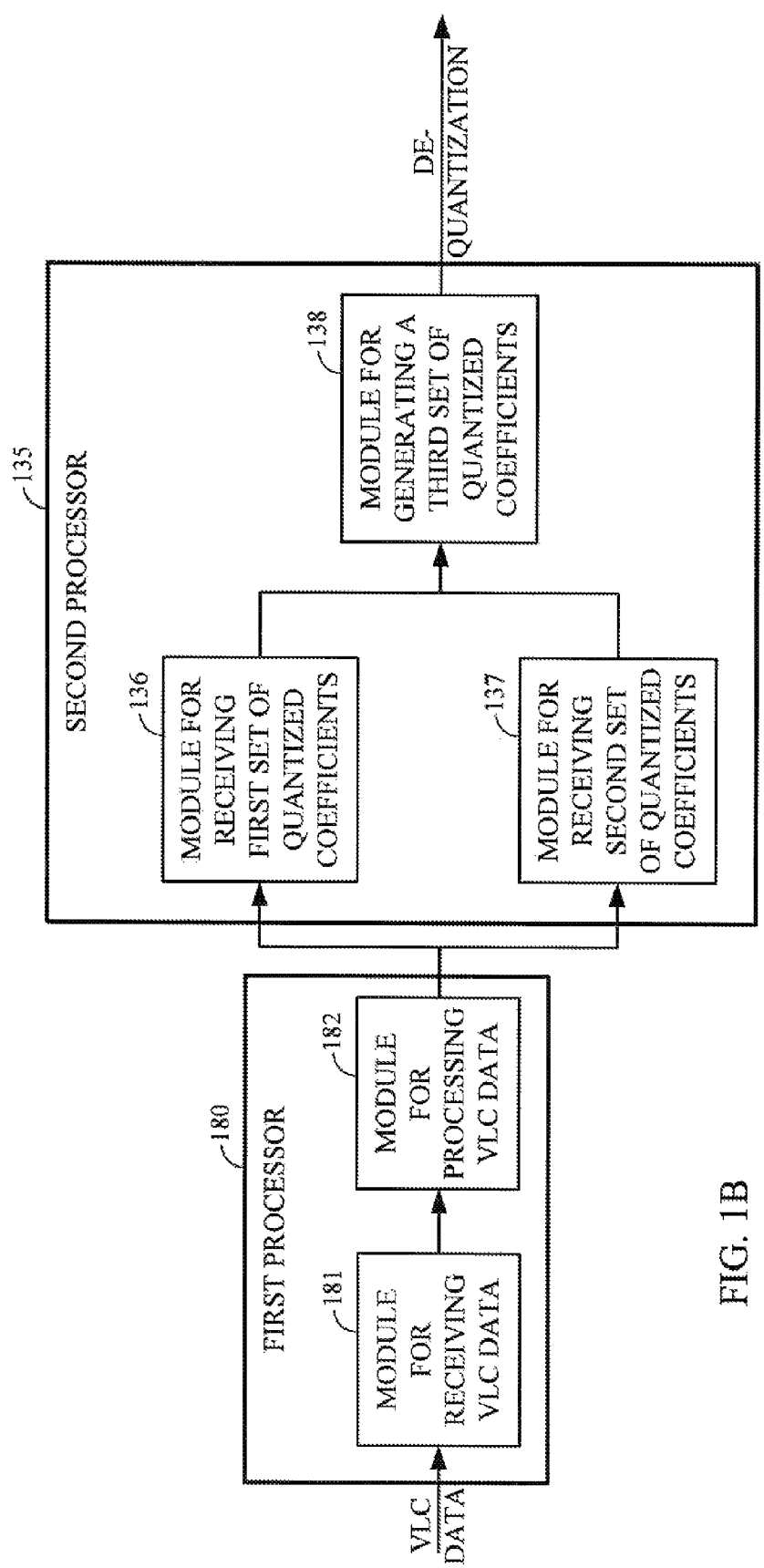
FIG. 1B is an illustration of an example first processor and second processor of the encoding system of FIG. 1A.

FIG. 1B is an illustration of an example first processor 180 and second processor 135 of the encoding system of FIG. 1A. The first processor 180 includes a module for receiving VLC data 181 and a module for processing VLC data 182. The second processor 135 includes a module for receiving a first set of quantized coefficients 136, a module for receiving a second set of quantized coefficients 137, and module for generating a third set of quantized coefficients 138.

In certain embodiments, the first processor 180 receives VLC data through its module for receiving VLC data 181. In certain embodiments, the VLC data may be representative of single or multiple-layer video data. The VLC data may be received from, for example, a communications component 140 of a decoder device 100, as shown in FIG. 1. In certain embodiments, a means for receiving VLC data representing the at least one video frame comprises module for receiving VLC data 181. The module for receiving VLC data 181 is further configured to send the VLC data to the module for processing VLC data 182. In certain embodiments, a means for processing the VLC data to generate the first set of quantized coefficients and the second set of quantized coefficients, wherein the VLC data processing causing the generation of the first set and second set of quantized coefficients is performed by a single processor comprises the module for processing VLC data 182. The module for processing VLC data 182 is configured to expand the VLC data using information included in the VLC data. For example, the module for processing VLC data 182 may contain logic for VLC symbol generation, also known as performing VLC table look ups, using VLC table information included in the VLC data. The module for processing VLC data 182 may further contain VLC run length expansion, and inverse zigzag scanning. The VLC processor may further be configured to send the expanded VLC data, quantized coefficients, to the second processor 135. In certain embodiments, the expanded VLC data may include multiple sets of quantized coefficients representative of multiple layers of video data.

In certain embodiments, the second processor 135 receives quantized coefficient data, such as sets of quantized coefficients, through the module for receiving a first set of quantized coefficients 136 and module for receiving a second set of quantized coefficients 137. In certain embodiments, a means for receiving a first set of quantized coefficients representing at least one video frame comprises the module for receiving a first set of quantized coefficients 136. In certain embodiments, a means for receiving a second set of quantized coefficients representing at least one video frame comprises the module for receiving a second set of quantized coefficients 137. The first and second sets of quantized coefficients may, for example, represent base layer and enhancement layer video data, respectively. The receiving modules 136 and 137 are further configured to send received quantized coefficient data to the module for generating a third set of quantized coefficients 138. In certain embodiments, a means for generating using the first set of quantized coefficients and second set of quantized coefficients, a third set of quantized coefficients representing the at least one video frame comprises the module for generating a third set of quantized coefficients 138. In certain embodiments, the module for generating a third set of quantized coefficients 138 is configured to combine the first set of quantized coefficients and second set of quantized coefficients using multiple layer video coding techniques discussed herein, such as the process disclosed with reference to FIG. 4. The module for generating a third set of quantized coefficients 138 may thus produce a third set of quantized coefficients representative of the first and second sets of quantized coefficients. In certain other embodiments, the module for generating a third set of quantized coefficients 138 is configured to generate a third set of quantized coefficients even if a set of coefficients is not received from one of the two receiving modules 136 and 137.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Figure 2:
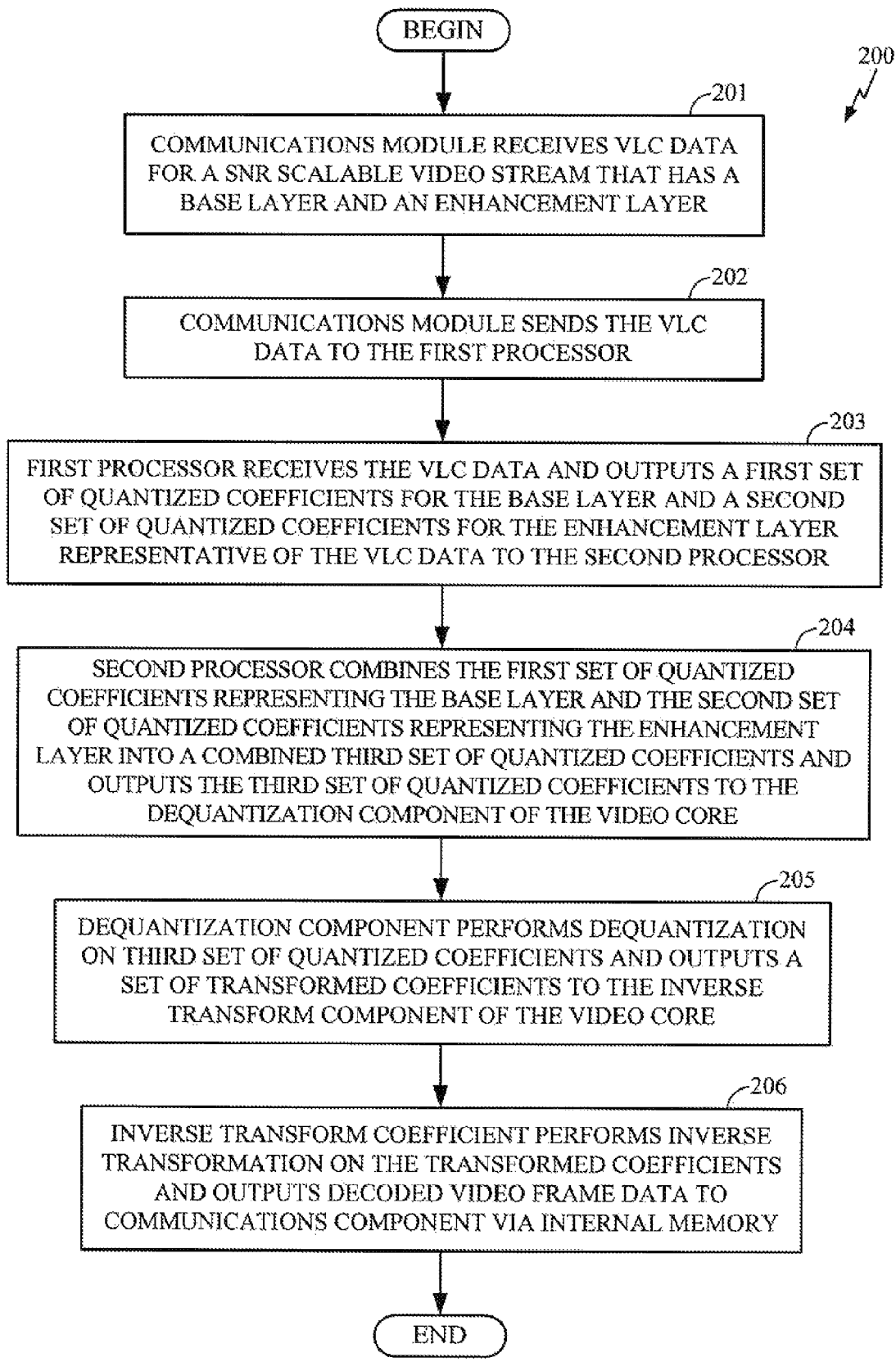
FIG. 2 is a flowchart of one example of encoding video.

FIG. 2 is a flowchart of a process for decoding SNR scalable video according to one embodiment of the invention. Although FIG. 2 shows one process for decoding SNR scalable video using an embodiment of multiple layer video encoding disclosed herein, other processes may also be used in combination with certain embodiments of multiple layer video encoding as discussed herein, such as those described in U.S. Patent Application No. 60/660,877 entitled "Scalable Video Coding with Two Layer Encoding and Single Layer Decoding" and incorporated herein by reference in its entirety.

Process 200 depicts the flow of decoding a video stream composed of a base layer and an enhancement layer using multiple layer video encoding. In step 201, the communications module of the decoder device receives VLC data for an SNR scalable video stream from the network. The SNR scalable video stream has two layers, a base layer and an enhancement layer. The communications module then sends the VLC data to the first processor 180 in step 202. The first processor 180 in step 203 expands the VLC data using the processes of VLC symbol generation, also known as VLC table lookup, followed by VLC run length expansion, and completing with inverse zigzag scan to produce the unpacked, quantized coefficients. The first processor 180 thus yields a separate quantized coefficient sets for both the base-layer and the enhancement layer. The two sets of quantized coefficients are then sent to the second processor 135. In step 204, the second processor 135 combines the first set of quantized coefficients representing the base layer and the second set of quantized coefficients representing the enhancement layer into a third set of quantized coefficients using certain inventive features as will be discussed below in reference to FIG. 3. In other embodiments, instead of the first processor 180 conducting the entire process of expanding the VLC data, the first processor 180 instead may conduct the VLC symbol generation and then the second processor 135 may conduct the VLC run length expansion and inverse zig-zag scan in order to yield the two sets of quantized coefficients representing the base and enhancement layers.

The third set of quantized coefficients is sent to the dequantization component of the video core, where in step 205 the component performs dequantization on the set, producing a set of transformed coefficients representative of the third set of quantized coefficients. The transformed coefficients are then sent to the inverse transform component, where in step 206 an inverse of the original transform function that was applied to the video stream to create the transformed coefficients is now applied to the transformed coefficients to reverse the process and recreate the video stream. The video stream is then placed in internal memory and communicated to the display using the communications component, and the process 200 is complete.

Figure 3:
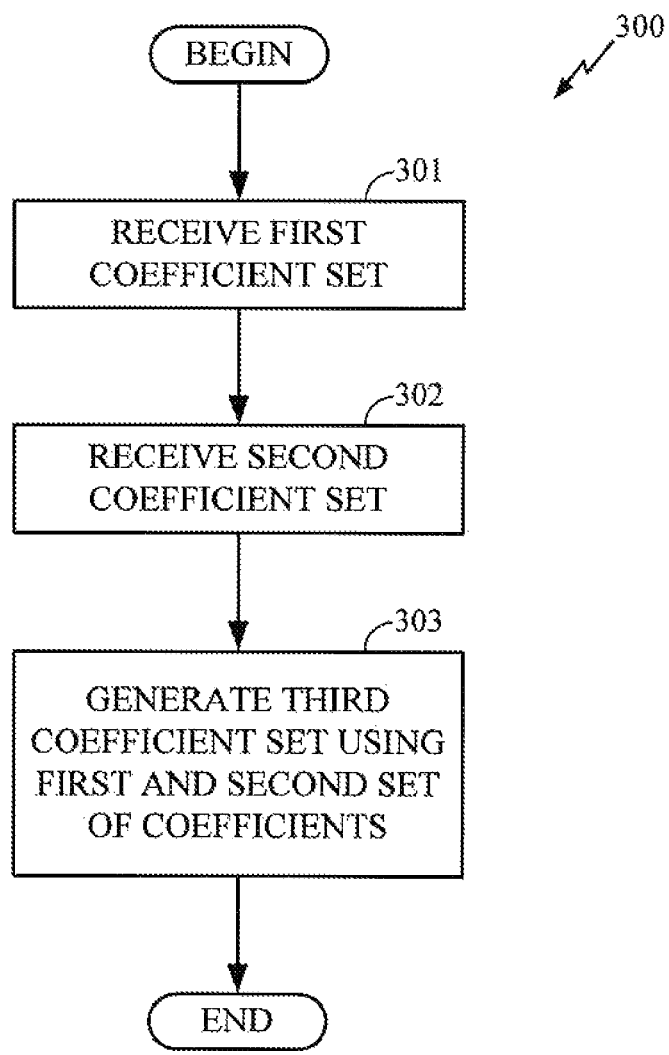
FIG. 3 is a flowchart of one example process performed by the first processor of FIG. 1A.

FIG. 3 is a flowchart of one example process of receiving and combining two sets of quantized coefficients representative of two separate layers of video data. The process illustrated provides greater detail to step 203 of FIG. 2. In certain embodiments, such as the system shown in FIG. 1 and the flowchart shown in FIG. 2, the process may be conducted by a RISC processor. In other embodiments, another type of processor may be used. In yet further embodiments, a plurality of processors may be used to receive and combine quantized coefficient data. The process begins in step 301 by first receiving a first set of quantized coefficients. The first set of quantized coefficients may in certain embodiments represent a layer of video data. For example, the first set of coefficients may be representative of a base layer. Next, in step 302, a second set of quantized coefficients is received. The second set of quantized coefficients may in certain embodiments also represent a layer of video data. For example, the second set of coefficients may be representative of an enhancement layer. In other embodiments, the first set of coefficients may be received after the second set of coefficients. In yet further embodiments, the two sets of coefficients may be received at the same time.

In step 303, a third set of coefficients is generated using the first set of coefficients and the second coefficients. In certain embodiments, the third set of coefficients set may be generated by combining the first set of coefficients and second set of coefficients. In certain embodiments, the third set of coefficients may be generated using quantization parameters associated with the first set of coefficients and/or second set of coefficients, as will be discussed further below in reference to FIG. 4. After the third set of coefficients is generated, the process is complete.

Figure 4:
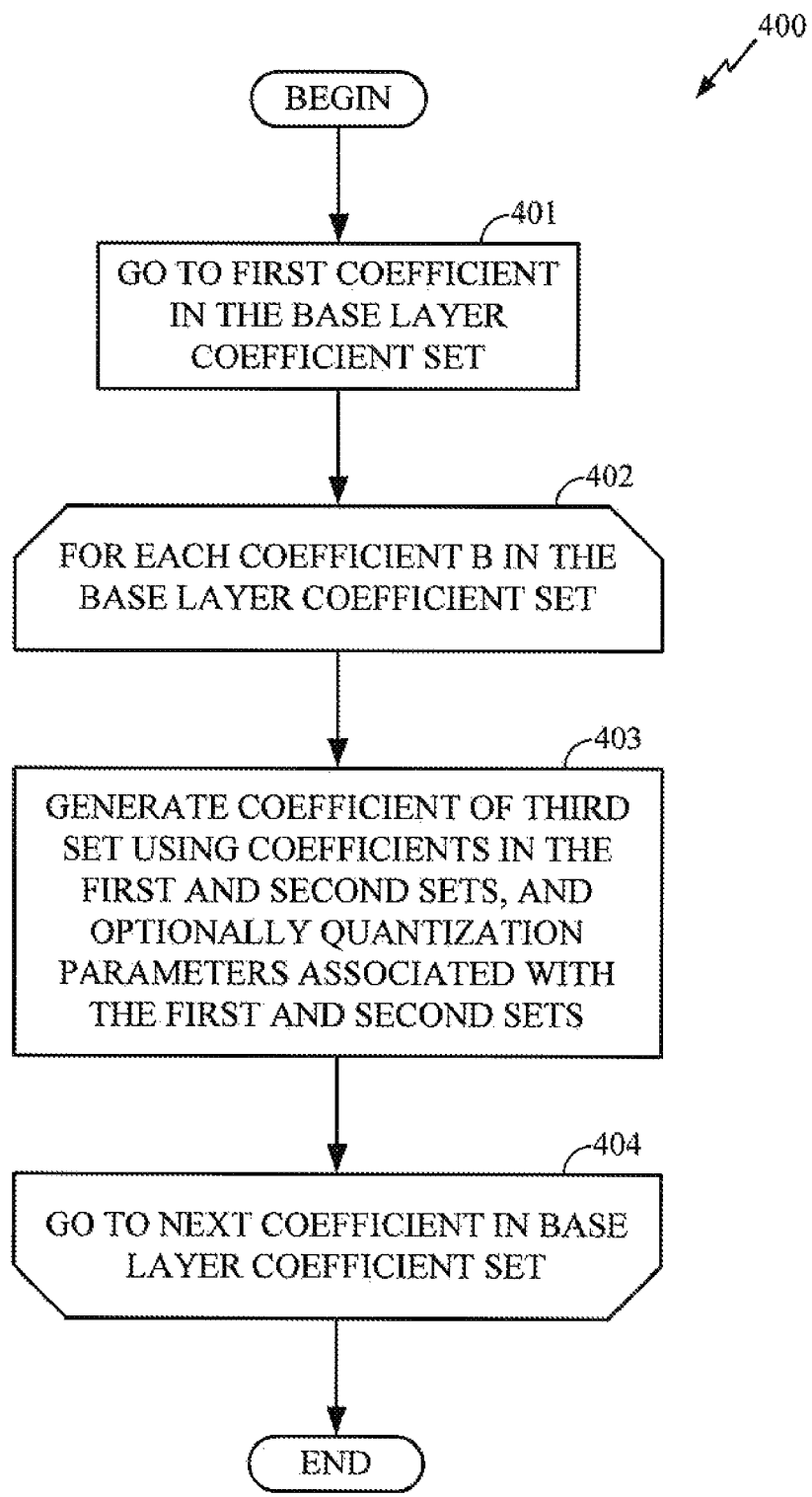
FIG. 4 is a flowchart of one example process of generating a third set of quantized coefficients representing a video originally represented by a first and second set of quantized coefficients.

FIG. 4 is a flowchart of one example process of generating a third set of quantized coefficients for a video originally represented by a first and second set of quantized coefficients. The process shown is for embodiments wherein quantization parameters associated with the coefficient sets have a common denominator of six. In other embodiments, the quantization parameters may have no common denominator. In one embodiment, the decoder device 100 may dynamically determine QPs at the time of combining the quantized coefficient sets representing both the base and enhancement layers.

The process begins at step 401 with the first coefficient in the base layer coefficient set. The process at step 402 then moves into an iterative loop, wherein each coefficient in the base and enhancement layer coefficient sets is combined. Specifically, starting with the first coefficient in the base layer coefficient set, $B_1$, the value of the corresponding coefficient in the combined coefficient set $C_1$ is based on an equation involving $B_1$, the corresponding coefficient in the enhancement layer coefficient set, $E_1$, and the quantization parameters affiliated with the base layer coefficient set $QP_B$ and enhancement layer coefficient set $QP_E$. Specifically, at step 403, the equation is $C_i = ((QP_B - QP_E)/3) * B_i + E_i$, where $i = 1 \ldots n$, and where n is the number of coefficients in the longest coefficient set between the base layer coefficient set and the enhancement layer coefficient set. The process illustrated utilizes base layer and enhancement layer quantization where $QP_B > QP_E$, and both QPs have a common denominator of six. The equation thus converts the base layer coefficients to the enhancement layer scale by shifting (a form of scaling) the coefficients one bit to the left.

This process of adding coefficients from the base and enhancement layers to generate coefficients for the combined layer using the equation above repeats for each coefficient in the base layer coefficient set in step 404, which in the embodiment shown is equal in length to the enhancement layer coefficient set. The process then ends when no coefficients remain to be processed in the base layer coefficient set. In other embodiments, other equations may be used to compute the combined coefficient set values, which may involve quantization parameters with different or no common denominators.

Those of ordinary skill would further appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, modules, and circuits described in connection with the examples disclosed herein may be implemented or performed with a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, registers, hard disk, a removable disk, a CD-ROM, or any other form of non-transitory storage medium known in the art. An exemplary storage medium is coupled to the processor such that the processor can read information from and write information to, the storage medium. In the alternative, the storage medium may be integral to the processor. The processor and the storage medium may reside in an ASIC. The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus.

Thus, a method and apparatus to provide acceptable quality video at a base layer and higher quality video at an enhancement layer with minimum decoder overhead by generating a single set of quantized coefficients representative of both layers have been described.

What is claimed is:

1. A method for processing multimedia data comprising:
   receiving, from a first processor, a first set of quantized coefficients representing at least one video frame, wherein the first set of quantized coefficients represent a base layer;
   receiving, from the first processor, a second set of quantized coefficients representing the at least one video frame, wherein the second set of quantized coefficients represent an enhancement layer;
   generating, at a second processor, using the first set of quantized coefficients and the second set of quantized coefficients, a third set of quantized coefficients representing the at least one video frame, wherein generating the third set of quantized coefficients is based in part on a first quantization parameter associated with the first set of quantized coefficients and a second quantization parameter associated with the second set of quantized coefficients, and wherein the first quantization parameter is not a factor of the second quantization parameter; and
   wherein the first set of quantized coefficients is scaled based on a difference of the first quantization parameter and the second quantization parameter to get a scaled first set of quantized coefficients and wherein the third set of quantized coefficients is generated using the scaled first set of quantized coefficients and the second set of quantized coefficients.

2. The method of claim 1, further comprising:
   receiving variable length coefficient (VLC) data representing the at least one video frame; and
   processing the VLC data to generate the first set of quantized coefficients and the second set of quantized coefficients, wherein the VLC data processing causing the generation of the first set and second set of quantized coefficients is performed by a single processor.

3. The method of claim 1, wherein the second set of quantized coefficients is indicative of at least one refinement to the first set of quantized coefficients.

4. The method of claim 1, wherein the third set of quantized coefficients is generated by adding the first set of quantized coefficients to the second set of quantized coefficients.

5. The method of claim 1, wherein the first quantization parameter and second quantization parameter have no common denominator.

6. The method of claim 1, wherein the first quantization parameter and second quantization parameter have a common denominator other than 1.

7. The method of claim 6, wherein the common denominator is 6.

8. An apparatus for processing multimedia data comprising:
   means for receiving, from a first processor, a first set of quantized coefficients representing at least one video frame, wherein the first set of quantized coefficients represent a base layer;
   means for receiving, from the first processor, a second set of quantized coefficients representing the at least one video frame, wherein the second set of quantized coefficients represent an enhancement layer;
   means for generating, at a second processor, using the first set of quantized coefficients and the second set of quantized coefficients, a third set of quantized coefficients representing the at least one video frame, wherein generating the third set of quantized coefficients is based in part on a first quantization parameter associated with the first set of quantized coefficients and a second quantization parameter associated with the second set of quantized coefficients, and wherein the first quantization parameter is not a factor of the second quantization parameter; and
   wherein the first set of quantized coefficients is scaled based on a difference of the first quantization parameter and the second quantization parameter to get a scaled first set of quantized coefficients and wherein the third set of quantized coefficients is generated using the scaled first set of quantized coefficients and the second set of quantized coefficients.

9. The apparatus of claim 8, further comprising:
   means for receiving VLC data representing the at least one video frame; and
   means for processing the VLC data to generate the first set of quantized coefficients and the second set of quantized coefficients, wherein the VLC data processing causing the generation of the first set and second set of quantized coefficients is performed by a single processor.

10. The apparatus of claim 8, wherein the first quantization parameter and second quantization parameter have no common denominator.

11. The apparatus of claim 8, wherein quantization parameters associated with the first set of quantized coefficients and the second set of quantized coefficients have a common denominator other than 1.

12. The apparatus of claim 11, wherein the common denominator is 6.

13. The apparatus of claim 8, wherein the means for generating the third set of quantized coefficients uses the first set of quantized coefficients added to the second set of quantized coefficients.

14. The apparatus of claim 8, wherein the second set of quantized coefficients is indicative of at least one refinement to the first set of quantized coefficients.

15. An apparatus for processing multimedia data comprising:
   a receiving module configured to receive, from a first processor, a first set of quantized coefficients representing at least one video frame and a second set of quantized coefficients representing the at least one video frame, wherein the first set of quantized coefficients represent a base layer and the second set of quantized coefficients represent an enhancement layer;
   a generating module configured to generate, at a second processor, using the first set of quantized coefficients and second set of quantized coefficients, a third set of quantized coefficients representing the at least one video frame, wherein generating the third set of quantized coefficients is based in part on a first quantization parameter associated with the first set of quantized coefficients and a second quantization parameter associated with the second set of quantized coefficients, and wherein the first quantization parameter is not a factor of the second quantization parameter; and
   wherein the first set of quantized coefficients is scaled based on a difference of the first quantization parameter and the second quantization parameter to get a scaled first set of quantized coefficients and wherein the third set of quantized coefficients is generated using the scaled first set of quantized coefficients and the second set of quantized coefficients.

16. A non-transitory machine readable medium comprising instructions for processing multimedia data, wherein the instructions upon execution cause a machine to:
  receive, from a first processor, a first set of quantized coefficients representing at least one video frame, wherein the first set of quantized coefficients represent a base layer;
  receive, from the first processor, a second set of quantized coefficients representing the at least one video frame, wherein the second set of quantized coefficients represent an enhancement layer;
  generate, at a second processor, using the first set of quantized coefficients and second set of quantized coefficients, a third set of quantized coefficients representing the at least one video frame, wherein generating the third set of quantized coefficients is based in part on a first quantization parameter associated with the first set of quantized coefficients and a second quantization parameter associated with the second set of quantized coefficients, and wherein the first quantization parameter is not a factor of the second quantization parameter; and
  wherein the first set of quantized coefficients is scaled based on a difference of the first quantization parameter and the second quantization parameter to get a scaled first set of quantized coefficients and wherein the third set of quantized coefficients is generated using the scaled first set of quantized coefficients and the second set of quantized coefficients.

17. A first processor for processing multimedia, said first processor being configured to:
  receive, from a second processor, a first set of quantized coefficients representing at least one video frame, wherein the first set of quantized coefficients represent a base layer;
  receive, from the second processor, a second set of quantized coefficients representing the at least one video frame, wherein the second set of quantized coefficients represent an enhancement layer;
  generate using the first set of quantized coefficients and second set of quantized coefficients, a third set of quantized coefficients representing the at least one video frame, wherein the processor is further configured to generate the third set of quantized coefficients based in part on a first quantization parameter associated with the first set of quantized coefficients and a second quantization parameter associated with the second set of quantized coefficients, and wherein the first quantization parameter is not a factor of the second quantization parameter; and
  wherein the first set of quantized coefficients is scaled based on a difference of the first quantization parameter and the second quantization parameter to get a scaled first set of quantized coefficients and wherein the third set of quantized coefficients is generated using the scaled first set of quantized coefficients and the second set of quantized coefficients.

* * * * *